United States Patent
Broman et al.

(10) Patent No.: US 8,601,445 B2
(45) Date of Patent: Dec. 3, 2013

(54) DETACHING PROFILERS

(75) Inventors: David Broman, Redmond, WA (US); Jonathan Keljo, Seattle, WA (US); Vance Morrison, Kirkland, WA (US); Sean Selitrennikoff, Sammamish, WA (US); Hsu-chieh Yuan, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1724 days.

(21) Appl. No.: 11/762,260

(22) Filed: Jun. 13, 2007

(65) Prior Publication Data

US 2008/0313618 A1 Dec. 18, 2008

(51) Int. Cl.
G06F 9/44 (2006.01)
G06F 11/00 (2006.01)

(52) U.S. Cl.
USPC .......... 717/130; 717/124; 717/127; 717/128; 717/129; 714/28

(58) Field of Classification Search
None
See application file for complete search history.

(56) References Cited

U.S. PATENT DOCUMENTS

| | | | |
|---|---|---|---|
| 5,659,752 A | 8/1997 | Heisch et al. | |
| 5,960,198 A * | 9/1999 | Roediger et al. | 717/130 |
| 6,199,095 B1 | 3/2001 | Robinson | |
| 6,928,639 B2 * | 8/2005 | Juan et al. | 717/127 |
| 6,934,935 B1 | 8/2005 | Bennett et al. | |
| 6,954,922 B2 | 10/2005 | Liang | |
| 7,013,456 B1 | 3/2006 | Dyke et al. | |
| 7,096,499 B2 | 8/2006 | Munson | |
| 7,178,131 B2 * | 2/2007 | Mitchell et al. | 717/124 |
| 7,392,431 B2 * | 6/2008 | Swoboda | 714/28 |
| 7,716,643 B2 * | 5/2010 | Goldin | 717/124 |
| 7,765,094 B2 * | 7/2010 | Bodden et al. | 703/22 |
| 7,877,734 B2 * | 1/2011 | Branda et al. | 717/130 |
| 8,006,235 B2 * | 8/2011 | Broman et al. | 717/130 |
| 8,028,277 B2 * | 9/2011 | Breitgand et al. | 717/130 |
| 2002/0010913 A1 | 1/2002 | Ronstrom | |
| 2003/0066060 A1 * | 4/2003 | Ford | 717/158 |
| 2004/0054944 A1 * | 3/2004 | Bates et al. | 714/38 |
| 2004/0205723 A1 * | 10/2004 | Juan et al. | 717/124 |
| 2005/0071815 A1 * | 3/2005 | Mitchell et al. | 717/127 |
| 2006/0195846 A1 | 8/2006 | Benedetti | |
| 2006/0265693 A1 * | 11/2006 | Goldin | 717/124 |
| 2007/0074171 A1 * | 3/2007 | Burka et al. | 717/127 |
| 2007/0089094 A1 * | 4/2007 | Levine et al. | 717/128 |
| 2011/0258610 A1 * | 10/2011 | Aaraj et al. | 717/128 |
| 2012/0110555 A1 * | 5/2012 | Bates et al. | 717/129 |

OTHER PUBLICATIONS

"Java Virtual Machine Profiler Interface", D. Viswanathan et al. IBM System Journal 2000, pp. 1-14, <http://wotan.liu.edu/docis/lib/goti/rclis/dbl/ibsyjo/(2000)39%253A1%253C82%253AJVMPI%253E/www.research.ibm.com%252Fjournal%252Fsj%252F391%252Fviswanathan.pdf>.*

(Continued)

*Primary Examiner* — Thuy Dao
*Assistant Examiner* — Zial A Chowdhury
(74) *Attorney, Agent, or Firm* — Michael B. Dodd; Dodd Law Group

(57) ABSTRACT

A profiler may be detached from an actively running application by first sealing communications between the application and profiler, then evacuating the profiler by waiting for any profiler-modified or instrumented code to complete execution, profiler runtime code to complete execution, cleaning up any residual items from the profiler, and shutting down the profiler. The profiler may be operational in many different environments, including a managed environment such as a virtual machine and those environments having just in time compiling of executable code.

17 Claims, 4 Drawing Sheets

100
PROFILER OPERATION

(56) References Cited

OTHER PUBLICATIONS

"Rightsizing Academic Computer Application at KFUPM", Mamdouh M. Najjar, Nov. 1995, pp. 1-8, <http://ctld.kau.edu.sa/Files/320/Researches/47268_18764.pdf>.*

"Techniques for Obtaining High Performance in Java Programs", Iffat H Kazi, Sep. 2000, pp. 213-240 (28), <http://delivery.acm.org/10.1145/370000/367714/p213-kazi.pdf?key1=367714&key2=1958095031&coll=DL&dl=ACM&ip=151.207.242.4&CFID=22409559&CFTOKEN=36950023>.*

Arno Puder, "A Cross-Language Framework for Developing AJAX Applications", [Online], ACM 2007, pp. 105-112, [Retrived from Internet on Aug. 25, 2013], <http://delivery.acm.org/10.1145/1300000/1294340/p105-puder.pdf>.*

Diomidis Spinellis, "Trace: A Tool for Logging Operating System Call Transactions", [Online], Apr. 25, 1994, pp. 56-63, [Retrieved from Internet on Aug. 25, 2013], <http://www.dmst.aueb.gr/dds/pubs/jrnl/1994-SIGOS-Trace/html/journal.pdf>.*

Greg Stitt et al., "Dynamic Hardwardsoftware Partitioning: A First Approach", [Online], ACM 2003, pp. 250-255, [Retrieved from INternet on Aug. 25, 2013], <http://www.ann.ece.ufl.edu/courses/eel6935_13spr/papers/Dynamic_HW_SW_Partitioning.pdf>.*

M. Dmitriev, "Application of the HotSwap Technology to Advanced Profiling", [Online], Jun. 2002, pp. 1-5, [Retrieved from Internet on Aug. 25, 2013], <http://citeseerx.ist.psu.edu/viewdoc/download?doi=10.1.1.57.7139&rep=rep1&type=pdf>.*

Griffith, et al., "Adding Self-Healing Capabilities to the Common Language Runtime" pp. 10, 2005.

Griffith, et al., "Manipulating Managed Execution Runtimes to Support Self-Healing Systems", DEAS'05, ACM, 2005 pp. 7.

Griffith, et al., "Effecting Runtime Reconfiguration in Managed Execution Environments", CRC Press, 2001, pp. 22.

* cited by examiner

DETACHING PROFILERS

BACKGROUND

Profilers are performance analysis tools that may be used to monitor the performance of a program or application when running. A profiler may assist a developer by collecting many different runtime statistics and other information about the application. Profilers may use a wide variety of techniques for collect data, including hardware interrupts, code instrumentation or modification, operating system interfaces, and performance counters.

Code instrumentation is a mechanism by which a profiler may make modifications to the application code to, among other things, send data to the profiler. In some embodiments, a virtual machine or other managed environment may be used to compile an application or portion of an application at the time the application is run. Such a compiling may be known as just in time compiling.

SUMMARY

A profiler may be detached from an actively running application by first sealing communications between the application and profiler, then evacuating the profiler by waiting for any profiler-modified or instrumented code to complete execution, profiler runtime code to complete execution, cleaning up any residual items from the profiler, and shutting down the profiler. The profiler may be operational in many different environments, including a managed environment such as a virtual machine and those environments having just in time compiling of executable code.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
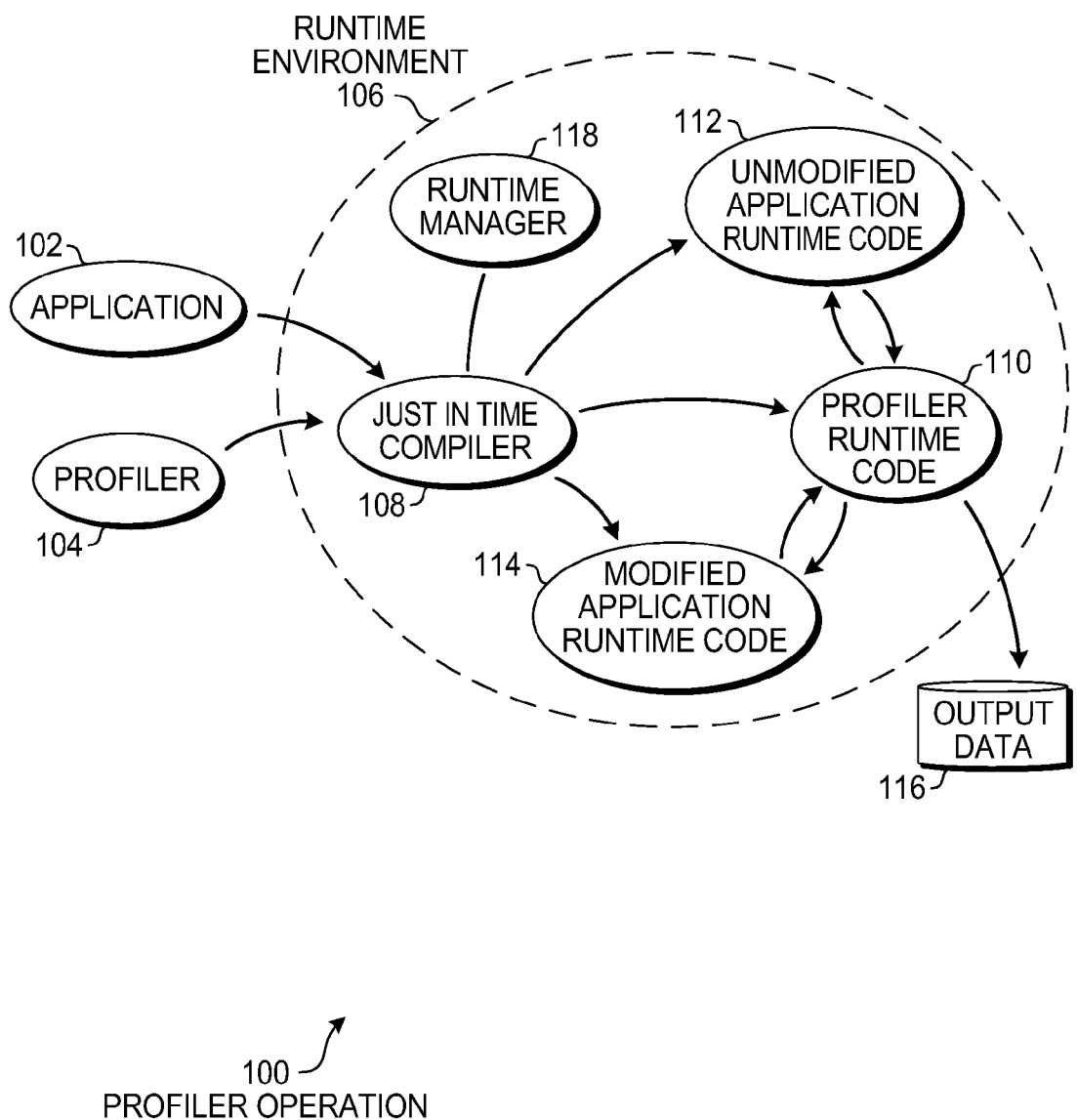
FIG. 1 is a diagram illustration of an embodiment showing a profiler operation.

A profiler may be detached from an operating program or application by first sealing the profiler from interacting with the application, then evacuating the profiler by waiting for any profiler-modified code to complete execution and cleaning up any other profiler-created items and shutting down the profiler.

Profilers may be used to monitor and extract data from running applications. In many instances, a profiler may passively monitor various memory states, function calls, operating system interfaces, or other items. In other instances, various hooks or small modifications may be made to the running application so that data may be sent from the application to the profiler for cataloging and monitoring.

The modifications or instrumentation made to the application code may be done by inserting code or changing existing code within certain functions of the application code prior to compiling the code. Other methods may include adding instrumentation to a compiled binary executable code, adding instrumentation or other monitoring at runtime, or other methods.

While operating with a profiler, an application may have several calls to profiler-modified functions in one or more call stacks. If a profiler is to be removed or detached from the application, those profiler-modified functions may linger in the call stacks for a period of time after the profiler has begun detaching. The profiler-modified functions may be tracked so that when the last of the profiler-modified functions has completed execution, the profiler may be shutdown.

During the evacuation process, there may be profiler code that is running on the system. The profiler runtime code may have some operations pending or in process. In some cases, the profiler runtime code may be waiting on a response from an application or a profiler-modified function. The profiler runtime code may be allowed to finish execution during evacuation and then be removed from the system.

Specific embodiments of the subject matter are used to illustrate specific inventive aspects. The embodiments are by way of example only, and are susceptible to various modifications and alternative forms. The appended claims are intended to cover all modifications, equivalents, and alternatives falling within the spirit and scope of the invention as defined by the claims.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram of an embodiment 100 showing a profiler operation. A profiler may be an analysis tool that measures the behavior of a program or application as it runs. The profiler may collect data or take measurements about the application in several manners, including passively observing different factors, actively querying the application, and by embedding a hook or other changes to the application code to intercept data or respond to messages from the profiler, among other operations.

An application 102 and profiler 104 may be operated in a runtime environment 106. The application 102 may be any type of computer program that performs any type of function.

The runtime environment 106 may be any type of environment wherein an application 102 may be operated. In some instances, the runtime environment 106 may be an operating system environment, while in other instances it may be a virtual machine environment. A virtual machine environment may be a virtualized environment between the application 102 and an operating system. In many virtual machine environments, an application may be operated within many different virtual machines that are operating on different hardware platforms, making the application portable.

Examples of an application virtual machine environment include Common Language Runtime, EiffelStudio, Forth Virtual Machine, Glukx, Hasm Assembler, Inferno, Java Virtual Machine, Low Level Virtual Machine (LLVM), Macromedia Flash Player, Perl Virtual Machine, Portable.NET, Smalltalk Virtual Machine, TrueType Virtual Machine, and others. Such environments may operate one or more applications within an operating system environment as a virtual machine. Other applications or programs may simultaneously operate directly with the operating system. Other technologies may also be used to operate the application 102 and profiler 104 together.

In many cases, a runtime environment 106 may provide specialized services that may be used by the profiler 104. In embodiments where a runtime environment 106 is not employed, other applications may be used to perform different functions described in this specification. For the purposes of this specification, an example of a profiler operating in a runtime environment may be used to exemplify and describe operational characteristics. However, a profiler and the detachment mechanisms for the profiler may be performed without a runtime environment.

In the runtime environment 106, a just in time compiler 108 may compile all or a portion of the application 102 and the profiler 104. The application 102 and profiler 104 may be an intermediate code, such as bytecode, that is partially compiled. In some embodiments, the profiler 104 may modify or insert portions of code in the application during the operation of the just in time compiler 108.

Application 102 and profiler 104 may be any type of computer executable programs or commands. In some instances, the application 102 and profiler 104 may be a source code that is compiled, a script or other interpreted commands, or machine executable binary code. Various embodiments may use different systems for generating machine readable or executable code.

A just in time compiler 108 may be used in a runtime environment 106 to perform a secondary or final compiling from bytecode to machine executable code. Just in time compilers may perform the compiling at runtime, and may compile all or a portion of an application initially. When a profiler 104 is present, in some instances the profiler 104 may interject code or change code in the application 102 at compile time. In other cases, a profiler 104 may interject or change code after compiling.

After compiling and when the profiler and application are operational, three different types of code may be running. Profiler runtime code 110 may be performing profiling functions and interacting with unmodified application runtime code 112 and modified application runtime code 114. In a typical embodiment, the application code, both modified and unmodified, may be running as a single application.

The modified and unmodified code is illustrated in the present figure as separate entities but may comprise a single set of executing code in practice. The modified and unmodified application runtime code 114 and 112, respectively, are illustrated separately because a detaching process for the profiler 104 operates on modified and unmodified application runtime code differently.

During normal operation, the profiler runtime code 110 may interact with the unmodified and modified application code 112 and 114, respectively, to gather and analyze data to produce output data 116. The output data 116 may be real time data that enables real time tracking and monitoring of the application, data that is stored and analyzed at a later time, or any other type of output data.

A profiler may be detached from a running application in two distinct steps. The first step may be to seal the profiler from initiating any new queries to the application. The second step may be to evacuate the profiler by undoing the various hooks or modified code in the application, waiting for any unanswered queries to be returned, and cleaning up any other items so that the profiler may be shut down. After detaching has been completed, the application may operate in a normal mode without the profiler present. In some embodiments, a detachment process may comprise a first step that seals the profiler from receiving or initiating new queries and schedules profiler-modified code to be replaced with unmodified application code. A second step may be to wait for pending queries to be processed and wait for the replacement process to complete. After the replacement process, the profiler may be shut down. Each embodiment may perform different sequences for detaching a profiler from an application.

In many runtime environments 106, a runtime manager 118 may provide some specialized services that may be used during a detach process. For example, the runtime manager 118 may keep track of which sections of application runtime code have been modified by a profiler, enabling a detach process to happen simply. In another example, a runtime manager 118 may track the various communications between a profiler and an application and be able to determine if any communications are pending. Other functions may also be performed by a runtime manager 118 that may otherwise be performed by the profiler or some other software or hardware device to enable a detachment of a profiler from an application.

In some embodiments, the detachment function may be performed by the profiler itself without assistance from a runtime manager within a runtime environment. In other embodiments, various services or functions of a runtime environment may be used to facilitate the detachment function.

Figure 2:
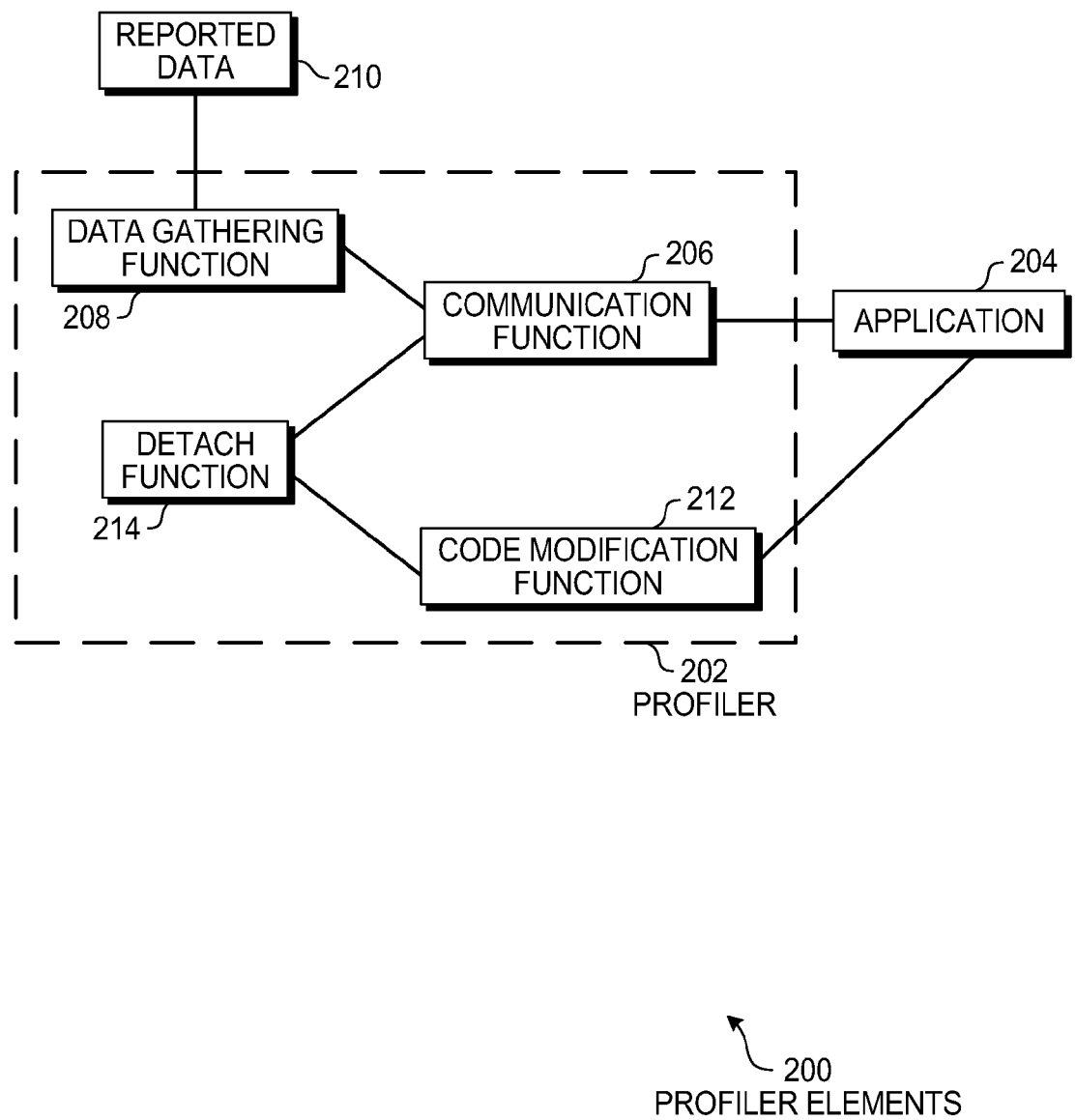
FIG. 2 is a diagram illustration of an embodiment showing various components or functions within a profiler.

FIG. 2 is a diagram of an embodiment 200 showing a profiler with various elements within the profiler. Profilers are devices that monitor a running application. Many profilers are capable of event driven operation, where a profiler monitors various events such as function calls, class loads or unloads, thread entry and exit. Some profilers provide statistical sampling of a target application's program counter or other parameter.

Still other profilers provide instrumentation to an operating application. Instrumentation may be any type of modification or insertion of hooks or other code in various operational areas of a monitored application. For example, in some applications, specific instructions may be added to an application for the purposes of supplying data to a profiler. In some cases, the modifications may be made before or during compiling, while other modifications may be made after compiling when the application is in a binary executable form. Still other embodiments may provide instrumentation during runtime, either directly before an application is run or during actual operation.

Various profilers may use one or more techniques to monitor an application. In many cases, different profilers may be used for different applications. For example, a heavily instrumented profiler may be used for low level debugging where a large amount of data may be collected. Such a profiler may have considerable performance implications on the application, while a lightweight statistical or event based profiler may be used for later verification and monitoring of different performance characteristics.

The profiler 202 may interface with and monitor an application 204 to produce reported data 210. The profiler 202 may have a communication function 206 that may communicate with the application 204 and handle direct requests to the application 204 and receive data or other responses from the application 204.

The data gathering function 208 may gather and analyze the data collected through the communication function 206 to provide the reported data 210.

The code modification function 212 may provide various instrumentation elements or code modifications to the application 204. The modifications may include hooks or event handlers that may report data about program flow, data, or other information to the communication function 206. In some instances, the modifications may include functions that may be called by the profiler to respond with certain data or notification about specific events.

The detach function 214 may provide a mechanism for detaching the profiler 202 from the application 204. When the detach function 214 is invoked, the detach function 214 may cause the communication function 206 to cease the new communications with application 204, then clean up any modified application code, receive any pending requests from the application 204, and perform any other clean up operations before closing down the profiler 202.

The detach function 214 may provide some administrative functions during normal operation so that a detach operation may perform smoothly. For example, when the code modification function 212 inserts code or changes code in the application 204, the location of the modification may be tracked. When tracking the modification, an unmodified version of the portion of application code may be stored for reinsertion during a detach operation.

Another administrative function of the detach function 214 may include monitoring the pending requests for communication with the application 204. One mechanism for monitoring the pending requests is to define each communication as a single request followed by a single response. Using such a definition, a counter may be incremented once for each outgoing communication from the application 204 to the profiler 202 and decremented once for each return communication. By inspecting the counter, the number of pending requests may be determined. Other mechanisms may be used to monitor and track pending communications between the application 204 and the profiler 202.

In some embodiments, some or all of the administrative functions may be handled by other monitoring programs or by a service in a runtime environment. For example, a service in a runtime environment may track communications between a profiler and an application and prevent shutting down a profiler while a communication request is pending. In another example a runtime environment service may track profiler-modified code in an application and, during evacuation, schedule and assist replacing profiler-modified code with unmodified application code. Each embodiment may perform various operations using services in a runtime environment, functions within a profiler, or by any other mechanism.

Figure 3:
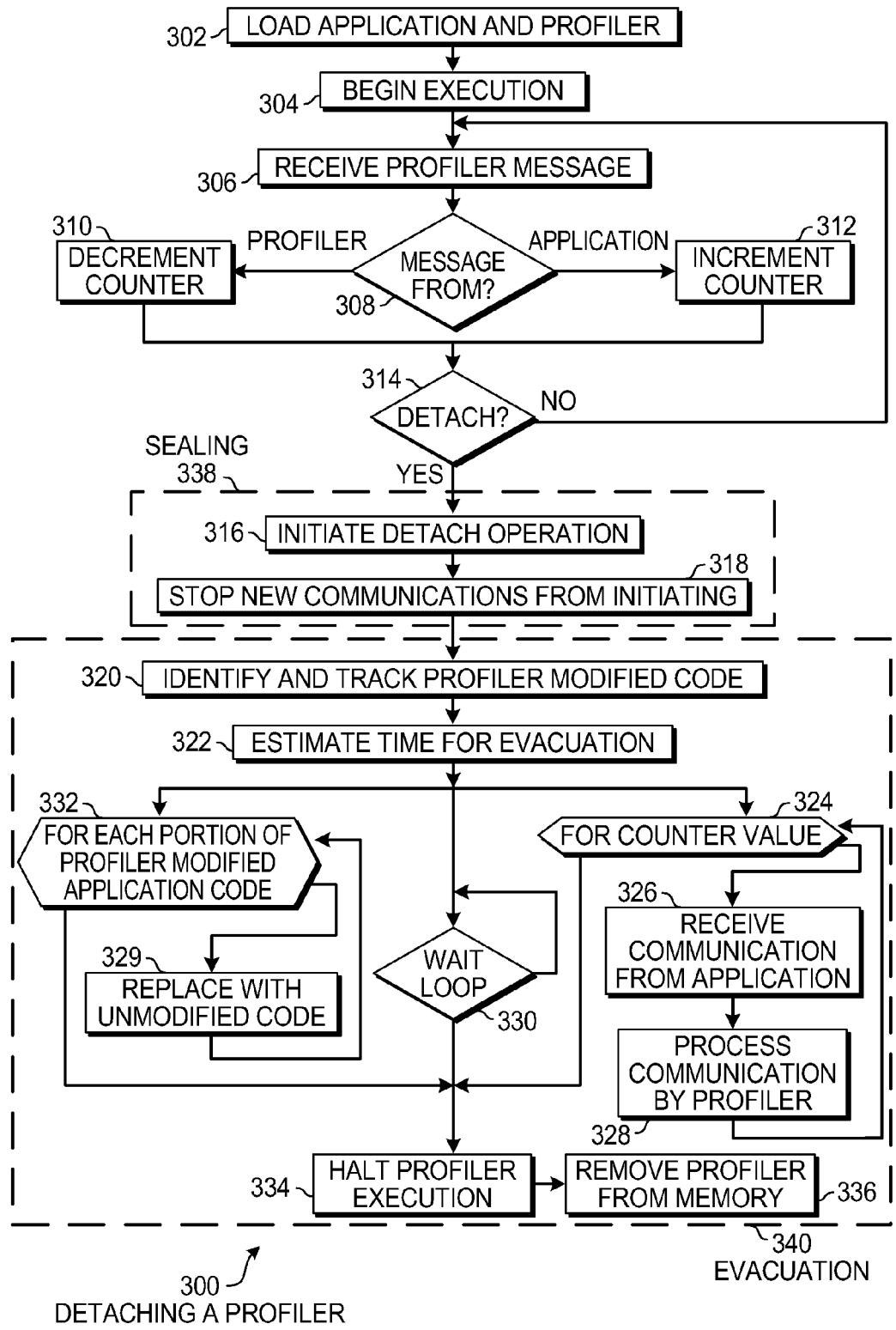
FIG. 3 is a flowchart illustration of an embodiment showing a method for detaching a profiler.

FIG. 3 is a flowchart illustration of an embodiment 300 showing a method for detaching a profiler. Detaching a profiler involves further requests from the profiler to the application for data, then allowing any pending communications to finish processing while removing any profiler-modified code to finish execution. The profiler may provide an estimated time for the profiler-modified code to finish so that any process directing the evacuation phase of the profiler may wait the estimated time before finalizing the detaching process.

The embodiment 300 illustrates a detaching process for a profiler from the general standpoint of the actions performed by a service in a managed runtime environment. The service may perform various administrative functions so that a profiler may be successfully detached from a target application. In some embodiments, one or more of the functions described in embodiment 300 may be performed by the profiler itself, a profiler management service, or some other entity.

The application and profiler are loaded in block 302 and begin execution in block 304. The sequence and mechanism for loading an application with a profiler may vary from implementation to implementation. In some embodiments, some or all of the profiler and application may be compiled together before executing. In other embodiments, the profiler may be operational prior to the application, while in other embodiments, the application may be operational prior to the profiler, for example.

A profiler-related message is detected in block 306. If the message is from the profiler in block 308, a counter is decremented in block 310. If the message is from the application in block 308, the counter is incremented in block 312. The counter of blocks 310 and 312 may be used to track requests and responses between the profiler and application. In some embodiments of a profiler, the communication procedure between a profiler and application may be rigidly defined so that each profiler request generates one and only one response from the target application.

Other embodiments may have different mechanisms for tracking communications between a profiler and an application. For example, an embodiment may be adapted to track when control is passed back and forth between an application and a profiler. In some cases, nested calls may be made between the application and profiler. A tracking mechanism may track the number of outstanding calls between the profiler and application using any mechanism.

The counter of blocks 310 and 312 may be used to determine how many communication requests are pending. The number of unfulfilled requests may be used during a detachment process to count down any remaining requests so that the profiler may be shut down after all requests are processed.

Some applications may be loaded and operational for a very long period of time and may operate very infrequently, such as applications that periodically collect data and update a database or perform other long term operations. Such applications may respond to profiler requests when the application performs specific tasks, which may occur infrequently. When detaching a profiler from such an application, any pending responses from the application may be tracked so that the profiler may finish processing the responses and so that any communication can be completed properly before the profiler becomes inactive.

In block 314, a detach sequence may be started, otherwise, the process continues with block 306.

The detach process may be divided into two large steps. The first step may be sealing 338 where new communications between the application and profiler may be prevented. The second step may be evacuation 340 where any pending actions by the application or profiler may be completed and the profiler cleanly removed from memory, allowing the application to function without the profiler attached.

In the sealing step 338, the detach operation is initiated in block 316 and new communications between the application and profiler may be blocked in block 318. In some embodiments, the application may be sealed from accepting calls from the profiler. Some such embodiments may block calls from the profiler as in block 318 as well as prevent the application from receiving such calls. In other embodiments, the application may be sealed from sending calls to the profiler. Some such embodiments may block the profiler from receiving such calls or may intercept and discard such calls.

The initiation of the detach operation in block 316 may have different affects in different embodiments. In some cases, a profiler may have a built in function that assists in detaching from an application, and the function may be activated by block 316. In other cases, one or more administrative services may be invoked or notified that a detach operation is commencing.

New communication between the application and profiler may be stopped in block 318. In some embodiments, a profiler may recognize a command that stops the profiler from receiving or sending further requests to the monitored application.

In other embodiments, another application or service may intercept communications between the profiler and application and return the communication to the initiating entity or ignore the communication. Such an application or service may recognize outgoing or incoming messages from either the profiler or application, evaluate the messages, and disposition the messages accordingly. Such an application or service may be a portion of a runtime environment such as a virtual machine.

The evacuation step 340 is a process through which any remaining items that were started by a profiler may be cleaned up and completed.

In block 320, profiler modified code in the application is identified and tracked. In some embodiments, application code that is modified by a profiler may have a tag or other identifier by which those portions of code may be identified by searching code stacks or threads. In block 320, an application or function may scan existing code stacks or threads and begin tracking those functions. In some embodiments, the profiler itself may be capable of identifying the modified code by scanning the code stacks or threads.

The functions or code elements that have been modified by a profiler may be tracked so that an original version of the code may be used to replace the modified versions.

In some embodiments, each portion of code that is modified may be tracked at the time of modification. For example, a runtime environment or other application may log each modified function in a memory location to facilitate detaching a profiler. The log may identify modified code and may include a link to non-modified code for each modified function. In a similar embodiment, a profiler may keep a log of modified code.

In block 322, an estimated time for a profiler to complete execution is determined. In some embodiments, a profiler may be capable of determining how much time will elapse before the pending requests are returned and before any profiler modified application code has finished executing. In other embodiments, a profiler monitoring function that may be provided through a runtime management system or other application or service may be capable of determining an estimated time.

An estimated time for evacuation may be useful when monitoring a detach process for a profiler, as the monitoring function may use the estimated time to query whether the profiler has actually completed evacuation and may be ready for removal. The estimated time may reduce the overhead that may be consumed by repeatedly checking for completeness when a profiler may have a long wait period.

Block 324 uses the message counter of blocks 310 and 312 to count down for each pending communication from the monitored application to the profiler. For each count, a communication may be received by the profiler in block 326 and any processing related to the communication performed in block 328. These steps enable outstanding requests by the profiler to be fulfilled and any data processed, preparing the profiler to shut down.

In parallel with processing each outstanding communication, each portion of profiler modified application code in block 332 may be removed and replaced with unmodified code in block 329. As profiler modified code is popped from a call stack, that portion of the executable code in memory may be replaced with an unmodified version.

In many cases, profiler modified code may be the code in an application that responds to a profiler request or initiates a communication with the profiler, and during an evacuation sequence 338, the modified code may be replaced when the request is fulfilled. In other instances, profiler modified code may be operating in other areas of the application code and may be replaced after the modified function is popped from a call stack.

The wait loop 330 may use the estimated time defined in block 322 to wait a period of time. The wait loop 330 may be useful in an embodiment where a runtime manager or other service or application is performing the detach process. In such an embodiment, the runtime manager may wait for the time estimated in block 322 to determine if the evacuation has completed. In some embodiments, the detach function may be performed in large part by the profiler itself and the wait loop 330 may be not used.

When all profiler modified code has completed in block 332 and all responses from the application have been received in block 324, the profiler execution may be halted in block 334 and the profiler may be removed from memory in block 336. As part of halting the profiler execution of block 334, any remaining items of the profiler activities may be cleaned up. For example, any threads started or otherwise modified by the profiler may be halted or profiler functions in other threads may be stopped. In another example, a profiler may modify a thread by hijacking or taking control of an existing thread, and such hijacking may be halted.

Figure 4:
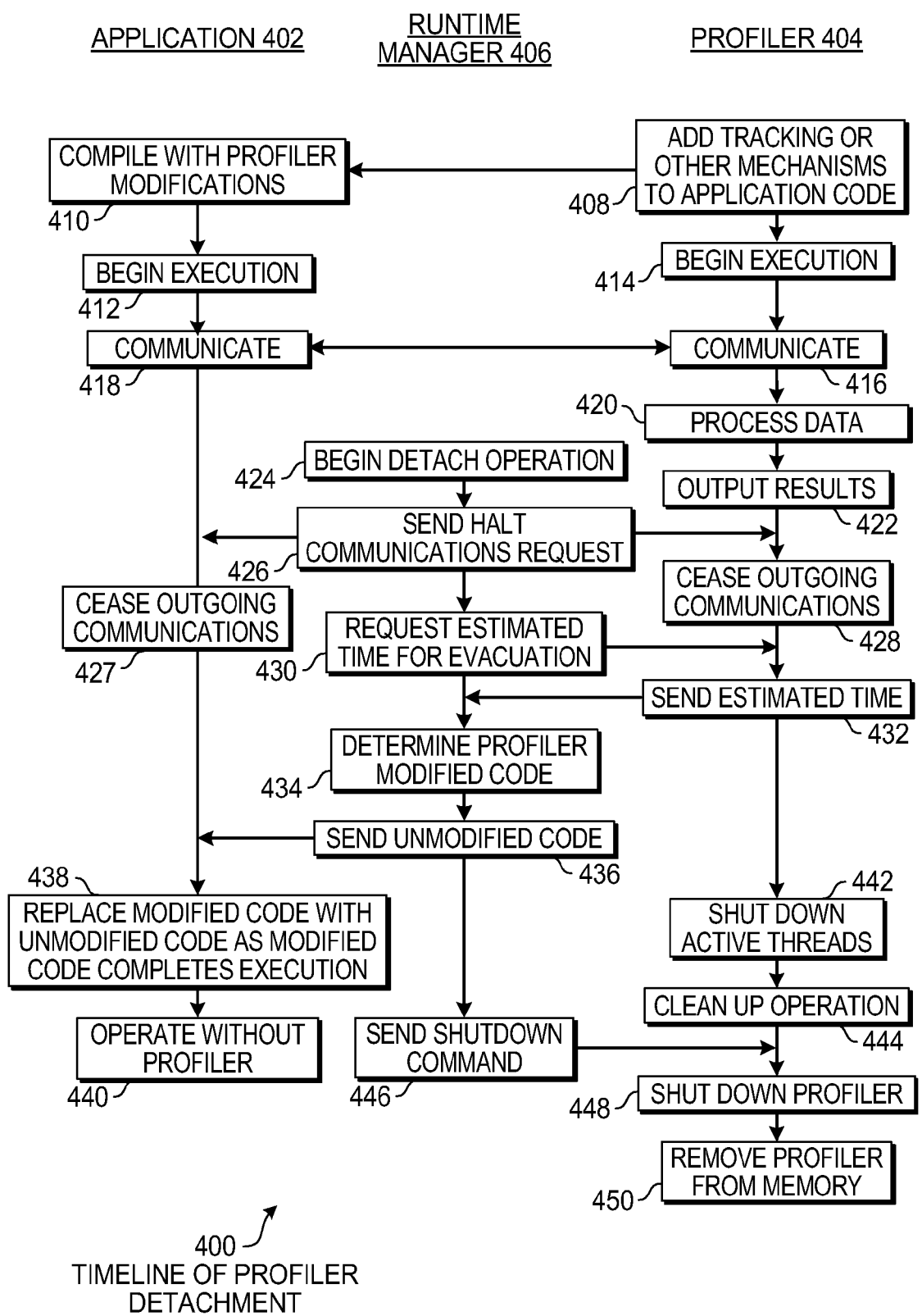
FIG. 4 is a timeline illustration of an embodiment showing a sequence for detaching a profiler.

FIG. 4 is a timeline diagram of an embodiment 400 showing a sequence of profiler detachment and interactions between an application 402, a profiler 404, and a runtime manager 406.

The sequence of embodiment 400 illustrates one method by which a runtime manager 406 may interact with an application 402 and a profiler 404. In many embodiments, the runtime manager 406 may be a function or service provided within a runtime environment, such as a virtual machine environment. In other embodiments, the runtime manager 406 may be a standalone application or service that facilitates the detaching process, whether part of a runtime environment or not.

In block 408, the profiler 404 may add tracking or other mechanisms to the application code and the application 402 may compile the changes with application code in block 410. In some embodiments, the profiler 404 may modify compiled code directly without having the application 402 compile the changes. Other embodiments may have different mechanisms for modifying application code for the profiler functions.

The application 402 and profiler 404 may begin execution in blocks 412 and 414, respectively. In some embodiments, the application code may be modified after execution begins.

In blocks 416 and 418, the profiler 404 and application 402 may communicate by initiating and responding to communication requests. In block 420, the profiler 404 may process the data. The sequence of blocks 416, 418, and 420 may be repeated many times throughout the operation of the application and profiler. In some embodiments, a request may be initiated by the application 402 and the profiler 404 may respond.

When the profiler receives a response from the application, the profiler may process the response in block 420 and output the results in block 422 in many different fashions. In some embodiments, the output may be a real time graphical user interface that displays various functions or parameters about the application. In other embodiments, a table of data may be generated that is processed at a later time. Each profiler may have a different output format and different method for processing the data. In some embodiments, the data may be tabulated in a very raw form, while in other embodiments, the data may be analyzed, summarized, sorted, or otherwise processed before output.

The runtime manager 406 may initiate a detach operation in block 424. The detach operation may be signaled by any mechanism, such as a user initiated detach, a scheduled detach operation, an error or data condition that initiates a detach operation through a daemon or other monitoring function, or any other condition or mechanism. In some instances, the profiler 404 or the application 402 may initiate a detach operation.

In block 426, the runtime manager 406 may send a halt communications request to either or both the application 402 or the profiler 404 that may cease outgoing communications in blocks 427 and 428, respectively. In the present embodiment, the profiler 404 may have a function that recognizes an input to halt outgoing communications. In other embodiments, the runtime manager 406 may halt further communications from the profiler 404 to the application 402 by intercepting such messages and preventing the messages from reaching the application 402.

After the profiler 404 has halted sending request to the application 402, there may be one or more pending responses from the application 402. When such a condition exists, the profiler 404 may still receive the responses and process the data.

In block 430, the runtime manager 406 may request an estimated time for evacuation from the profiler 404, which may return an estimated time in block 432. The estimated time may be used to determine when to periodically check for successful completion of the evacuation phase of the detach process.

The runtime manager 406 may determine which portions of the application code may have been modified by the profiler 404. In some instances, the runtime manager 406 may search compiled application code for profiler modified code, compare unmodified application code with the current application code, search running code stacks or threads for modified code, or any other mechanism for locating modified code.

Based on the modified code determined in block 434, unmodified code is sent to the application 402 in block 436, where the modified code is replaced with unmodified code as any modified code completes execution. In some embodiments, non-executing modified code may be replaced directly while executing modified code may be replaces as the codes finish execution.

After all of the modified code has finished execution and has been replaced with unmodified code in block 438, the application 402 may operate normally without the profiler in block 440.

While any modified code is being replaced by the application 402, the profiler 404 may begin shutting down any threads used by the profiler 404, including any threads that have been spawned by the profiler 404. In some instances, the profiler 404 may hijack a thread by placing functions to be executing on a thread that is not controlled directly by the profiler. In such an instance, the functions on the hijacked thread may be processed to completion or identified and removed from the threads. The profiler 404 may perform such operations including any further cleanup operations in block 444.

In block 446, the runtime manger 406 may send a shutdown command to the profiler 404. The profiler 404 may shutdown in block 448 and be removed from memory in block 450.

The embodiment 400 is one method by which a profiler may be removed or detached from an application. Other methods may use a similar sequence but have one or more operations performed by different components. For example, in some other embodiments, the profiler 404 or the application 402 may perform some of the functions shown by the runtime manager 406.

Regardless of the breakdown between different components, the overall process for removing or detaching a profiler from an application may comprise halting further communications initiated by the profiler or application and replacing any profiler modified code with unmodified code in the application so that the application may continue to function normally. Additionally, any pending communications from the application to the profiler may be allowed to complete so that the profiler may cleanup and terminate.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A computer implemented method comprising:
   initiating an executable application and a profiler for said executable application;
   stopping new communication between said profiler and said executable application;
   determining an estimated time for said profiler to shut down;
   identifying profiler modified code within said executable application for a first function, said modified profiler code being in a call stack;
   determining that said profiler modified code has completed operation;
   identifying a thread modified by said profiler;
   shutting down said thread; and
   shutting down said profiler.

2. The method of claim 1 further comprising:
   replacing said profiler modified code with non-profiler modified code for said first function.

3. The method of claim 2, said replacing being performed after said determining.

4. The method of claim 1 further comprising:
   identifying a profiler function in said call stack; and
   removing said profiler function from said call stack.

5. The method of claim 1 being performed in a managed code environment.

6. The method of claim 5, said managed code environment being a virtual machine.

7. The method of claim 1 comprising compiling at least a portion of said executable application with at least a portion of said profiler.

8. The method of claim 7, at least a portion of said compiling being performed at runtime.

9. A computer readable memory not comprising a signal but comprising computer executable instructions adapted to perform the method of claim 1.

10. A system, said system comprising:
    a processor;
    a library of common functions;
    a runtime engine adapted to execute an application;
    a profiler operable with said application;
    a profiler detachment mechanism adapted to:
      stop new communication between said profiler and said executable application;
      determine an estimated time for said profiler to shut down;
      identify profiler modified code within said executable application for a first function, said modified profiler code being in a call stack;
      determine that said profiler modified code has completed operation;
      identify a thread modified by said profiler;
      shut down said thread; and
      shut down said profiler.

11. The system of claim 10 comprising a managed code environment.

12. The system of claim 11, said managed code environment comprising a virtual machine.

13. The system of claim 10, said profiler detachment mechanism further adapted to:
    replace said profiler modified code with non-profiler modified code for said first function.

14. A computer hardware device comprising:
    a processor;
    a monitoring function adapted to monitor at least one parameter from an executing application;
    a code modification function adapted to modify code within said executing application to produce device-modified code;
    a detach function adapted to:
      stop new communication between said device and said executable application;
      determine an estimated time for said device to shut down;
      identify device-modified code within said executable application for a first function, said device-modified code being in a call stack;
      determine that said device-modified code has completed operation;
      identify a thread modified by said device;
      shut down said thread; and
      shut down said device.

15. The device of claim 14 operable within a managed code environment.

16. The device of claim 14, a portion of said device being compiled with at least a portion of said executable application.

17. The device of claim 14 being comprised in computer executable instructions on a computer readable memory.

* * * * *